W. C. BAKER.
POWER TRANSMITTING MECHANISM.
APPLICATION FILED JULY 15, 1915.
1,226,742.
Patented May 22, 1917.
3 SHEETS—SHEET 2.
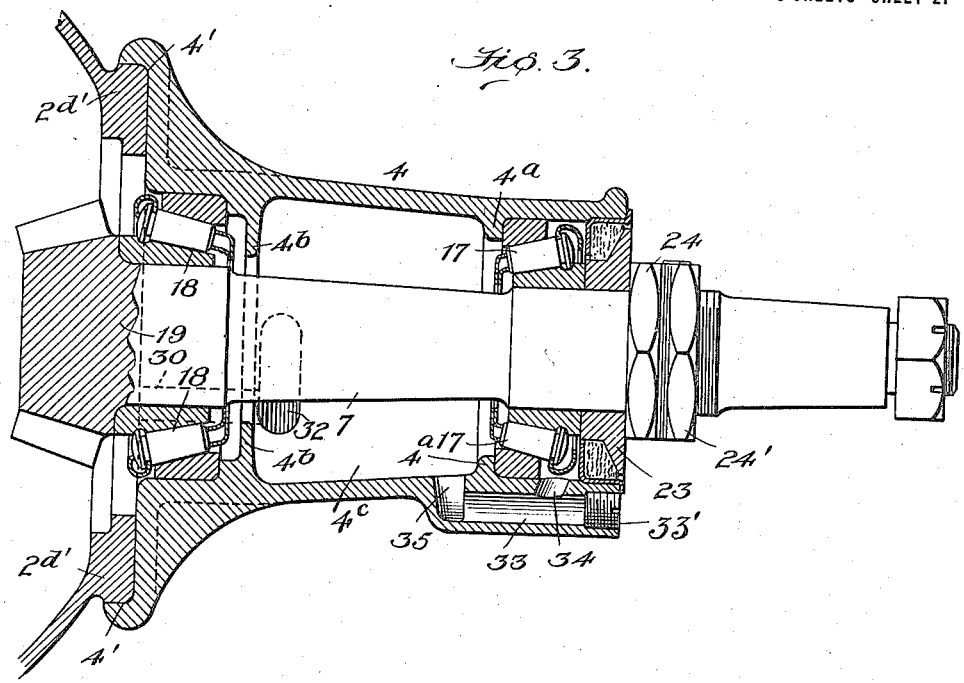
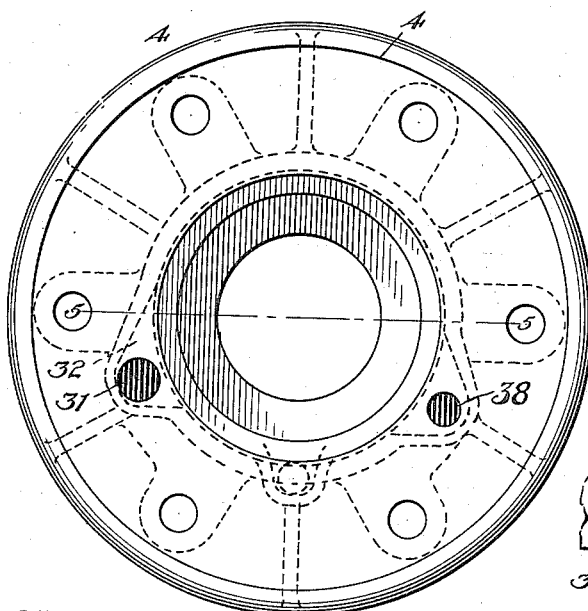
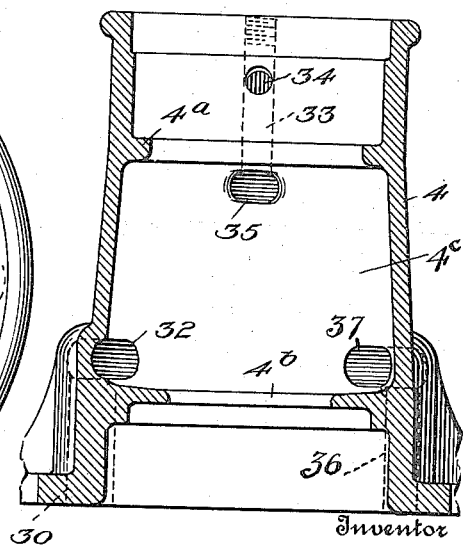

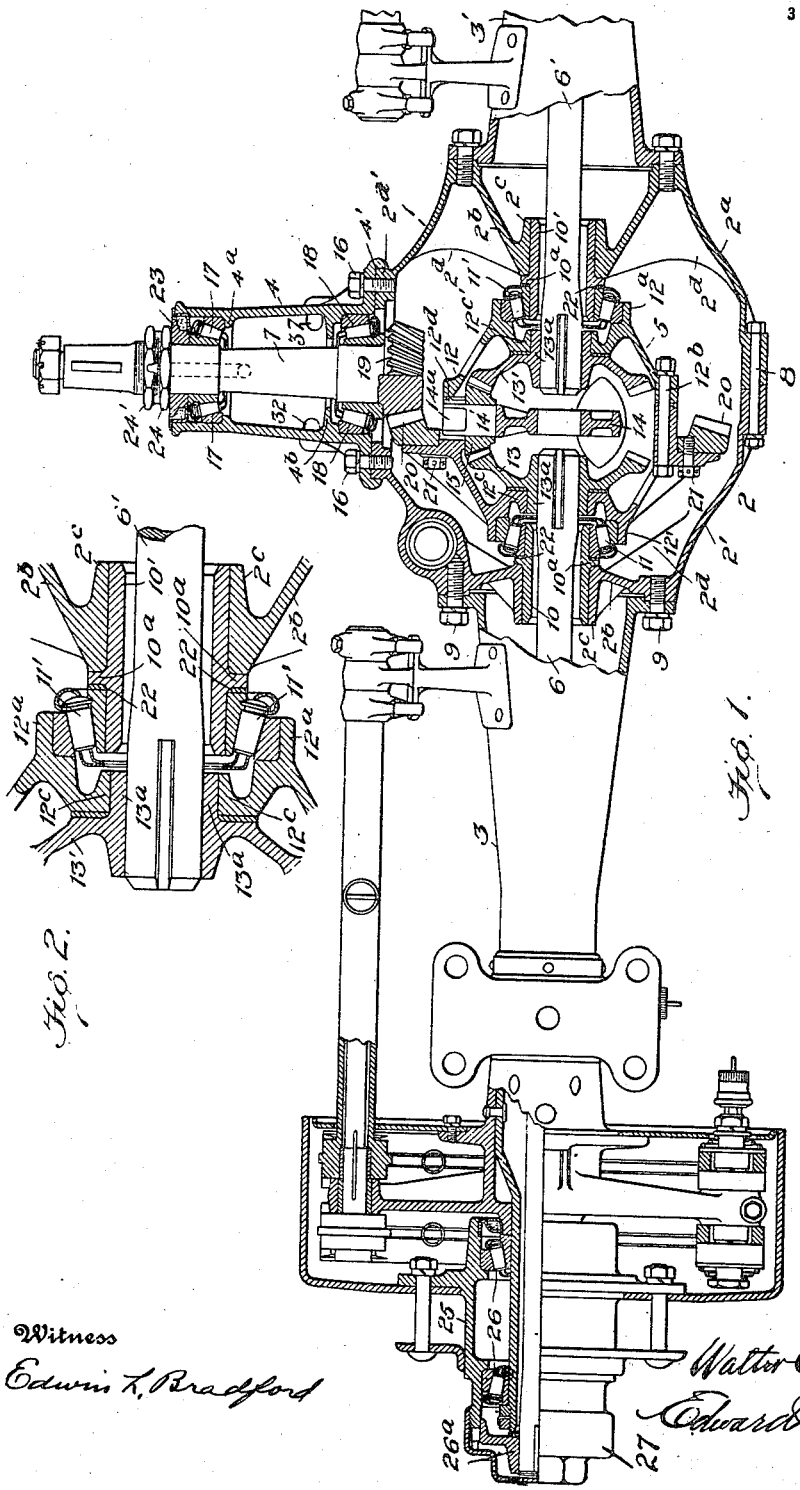

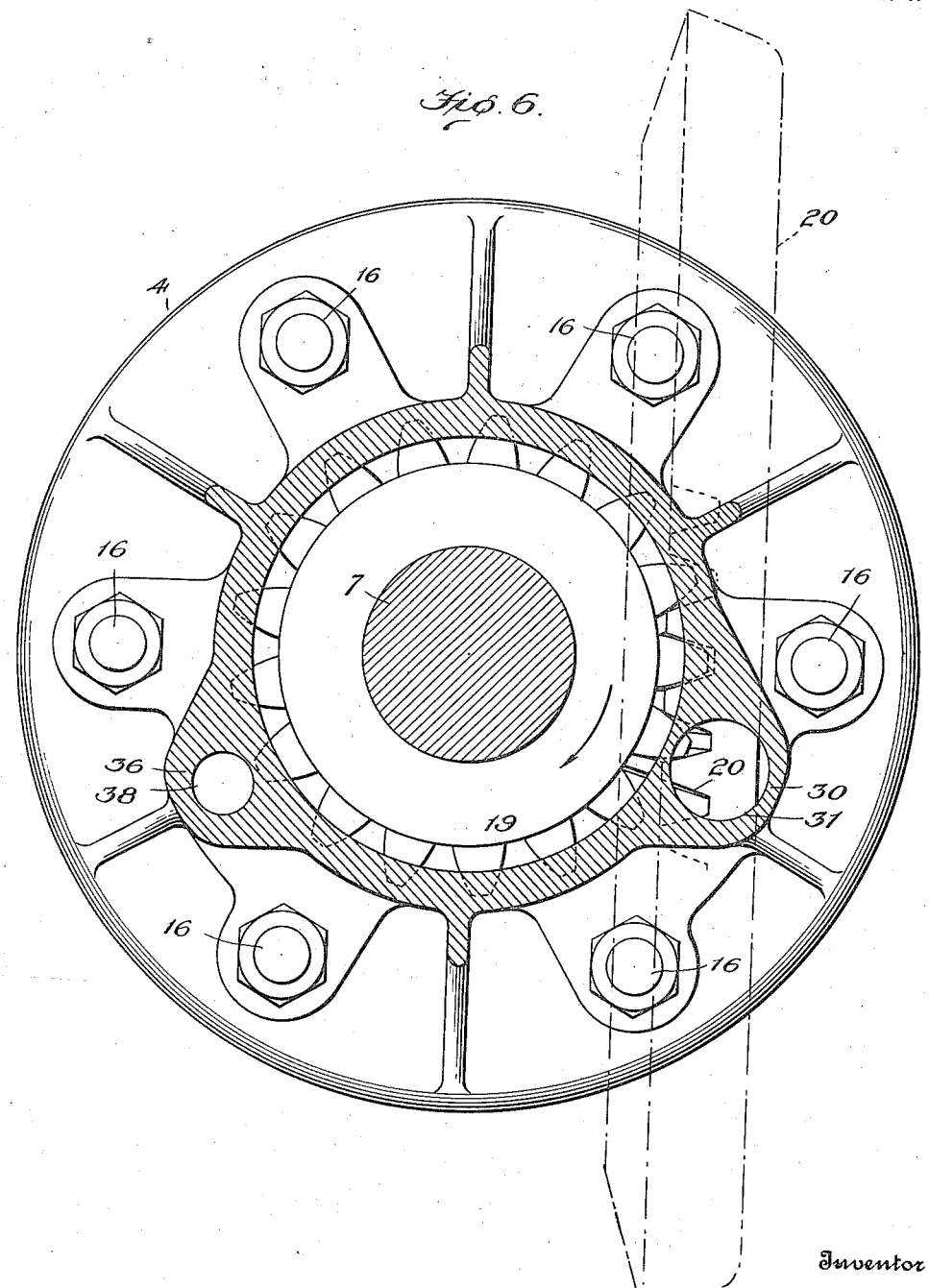

UNITED STATES PATENT OFFICE.

WALTER C. BAKER, OF CLEVELAND, OHIO, ASSIGNOR TO THE AMERICAN BALL BEARING COMPANY, OF CLEVELAND, OHIO, A CORPORATION OF OHIO.

POWER-TRANSMITTING MECHANISM.

1,226,742. Specification of Letters Patent. Patented May 22, 1917.

Application filed July 15, 1915. Serial No. 40,090.

*To all whom it may concern:*

Be it known that I, WALTER C. BAKER, a citizen of the United States, residing at Cleveland, in the county of Cuyahoga and State of Ohio, have invented certain new and useful Improvements in and Relating to Power-Transmitting Mechanism, of which the following is a specification.

This invention relates to improvements in power transmitting mechanism, more particularly to final driving or propelling mechanism for motor vehicles.

One of the objects of the invention is to provide rear axle drive mechanism which will transmit power delivered thereto with high efficiency and minimum noise.

Another object of my invention is to provide such mechanism capable of economical manufacture, including assembly.

Another object of my invention is to reduce as much as possible weight consistent with durability in such mechanism.

Still a further object of the invention is to provide for and insure proper lubrication of all bearings, particularly the thrust bearings along the propeller shaft of a bevel gear drive transmission mechanism such as a driving axle or jack shaft.

Another object of my invention is to insure proper lubrication of the outer bearing of a pair of anti-friction bearings for the propeller shaft, where such propeller shaft drives a right hand spirally cut driving or bevel gear.

Other objects of my invention will be obvious to one skilled in the art from the following description of apparatus embodying it which I have herein selected for the purpose of illustration.

Figure 1 is a view partly in plan and partly in section of a part of a power transmitting mechanism embodying my invention.

Fig. 2 is a section illustrating the mounting of one end of the differential housing, the adjacent differential gear and the connection between said gear and the inner end of the driven shaft.

Fig. 3 is a longitudinal axial section of the portion of the housing which supports the propeller shaft.

Fig. 4 is a rear end elevation of the forwardly extending section or horn of the axle housing.

Fig. 5 is a section on the line 5—5 of Fig. 4.

Fig. 6 shows a vertical section through the forwardly extending portion or horn of the axle housing, the bearing 18 being removed and the shaft 7 shown in section, and the meshing teeth of the gears 19 and 20 being indicated in their relation to the inlet port 31.

1 indicates as an entirety the rear axle housing. It preferably comprises a centrally disposed enlarged section 2, laterally extending tubular sections 3, 3′, and a forwardly extending section or horn 4.

The enlarged section 2 is adapted to receive and support a suitable differential mechanism, indicated as an entirety by 5.

The tubular lateral extensions 3, 3′, are intended to house the driven shaft sections 6, 6′, and the section 4 is arranged to receive and support the propeller or drive shaft 7.

Preferably the section 2 is comprised of two parts 2′, 2ª, which are snugly fitted together at their adjacent edges and detachably secured together by means of bolts 8. Each of the portions 2, 2ª, has an inwardly extending support 2ᵇ, 2ᵇ, having alined tubular hubs 2ᶜ, 2ᶜ. Each said support is shaped like the frustum of a cone and has integral strengthening webs 2ᵈ, 2ᵈ, between it and the adjacent inner wall of the housing. The inner end of the tubular section 3 is snugly fitted to and detachably secured by means of bolts 9 to the adjacent wall of the part 2′ of the section 2 of the housing, whereas the inner end of the tubular section 3′ is similarly secured to the adjacent face of the portion 2ª.

The section 2 of the housing may be made of any suitable relatively light material, such as an aluminum alloy, lending itself to simple, cheap and rapid machining and assembly.

10, 10′ are tubular sleeves, each of which fits at one end in the adjacent hub 2ᶜ and has an annular flange 10ª which bears or thrusts against the adjacent inner face of the adjoining support 2ᵇ.

11, 11′ are anti-friction bearings of any well known type, each supported on the inner end of the adjacent sleeve 10, 10′, respectively.

For the purpose of illustration I have shown anti-friction bearings of the taper roller type, the rolls being so disposed that the outward thrusts of the rolls will be transmitted through the inner race of each bearing to the adjacent flange 10ª and thence to the adjoining support 2ᵇ.

12 is a differential housing, having laterally extending tubular hubs 12', 12ª supported upon the outer races of the adjoining anti-friction bearings 11, 11', respectively. This differential housing may be constructed in any well known manner. I have shown it to be composed of two parts separable in a plane transverse to the longitudinal axis of the housing, and which are held together by bolts 12ᵇ.

The differential gearing within the differential housing may be of any well known form. I prefer to use bevel gearing for this purpose and have shown a pair of driven gears 13, 13', each having a hub 13ª which is mounted in the adjacent hub 12ᶜ, 12ᶜ′, respectively, of the differential housing. Each hub 13ª is suitably recessed to receive the broached, splined or squared inner end of one of the driven shafts 6, 6' and support the same while rotatable therewith in either direction about the axis of said shaft, it being understood that each of the shafts 6, 6' may be detached at its inner end from the driven gears 13, 13', respectively, by outward movement of the shaft.

14 is a spider having radially disposed spindles 14' with flattened ends 14ª. The differential housing 14 is provided with a plurality of elongated openings 12ᵈ, corresponding in number to the number of spindles 14' on the spider 14 and each adapted to receive the flattened end 14ª of one of said spindles and to cause said spindles to rotate with the housing while permitting them to move to and fro longitudinally thereof. 15 are differential pinions, each mounted on one of the spindles 14'. As is well known in the art, the construction just described permits the differential gears readily to adjust and aline themselves to each other, and obviates end thrusts through them and the spindles 14' onto the differential housing 12. The spider 14 may be said to float within the differential housing 12 in operation.

The forwardly extending axle housing section 4 at its rear end is recessed at 4' to receive the boss 2ᵈ′ on the forward end of the section 2, and is secured to the latter by means of bolts 16.

17, 18 are anti-friction bearings of any suitable type, disposed preferably at opposite ends of the section 4 and rotatably supporting and positioning the driving or propelling shaft 7.

For the purpose I have shown anti-friction bearings of the taper roller type. The rollers of the forward bearing 17 are disposed to take thrust of the shaft 7 rearwardly or inwardly toward the axle sections 6, 6', while the rollers of the bearing 18 are disposed to take the thrust of the shaft 7 forwardly or outwardly away from the axle sections 6, 6'.

19 is a driving gear on the end of the shaft 7 within the housing section 2; it may be formed integrally with the shaft. 20 is a driven gear meshing therewith and detachably secured, as by means of screws 21, to the differential housing 12 to rotate the latter.

The proper position of the driven gear 20 along its axis to correctly mesh with the driving pinion 19 may be obtained by interposing between the flanges 10ª, 10ª on the sleeves 10, 10' and the inner adjacent anti-friction bearing races or cones, suitable spacing washers 22. The proper relation of the driving pinion 19 and anti-friction bearings 17 and 18 therealong may be maintained by means of suitable shoulders 4ª, 4ᵇ, in the section 4, washer 23 and nuts 24, 24' engaging screw threads on the shaft 7.

The connections between the outer ends of the driven shaft 6, 6' and the wheel hubs may be made and these parts may be supported and mounted in any well known and suitable manner. For the purpose of illustration I have shown hubs 25 mounted on anti-friction bearings 26 supported upon the outer ends of the tubular extensions 3, 3'. The outer end of each shaft 6, 6' is connected to the adjacent hub 25 by a clutch plate 26ª rotatable with the shaft section, interlocking in any well known manner with the adjacent edge of the hub 25, which interlock is maintained by hub cap 27.

Where the propeller shaft for the bevel driving gear is mounted on two or more spaced anti-friction bearings, considerable difficulty at times with specially cut gears has been experienced in properly lubricating the front bearing, or the bearing which supports the front end of the propeller shaft. Again, where taper roller bearings are employed the tendency of the taper rollers in operation is to throw or discharge under centrifugal action lubricant from the bearings outwardly from the large ends of the taper rollers. In fact, I have found the outer or front bearing 17 coöperating with right hand spirally cut bevel gears soon to be destroyed in actual practice, where for lubrication reliance was made that lubricant from within the housing 2 would work its way to the bearing 17 and lubricate it. And I further have found that lubricant, placed in the section 4 and between the taper roller bearings 17 and 18 when the mechanism was assembled, would not suffice and would soon be discharged by the centrifugal action of the taper rollers.

Accordingly I have conceived the idea of using the propelling action upon the lubricant between meshing teeth of a set of driving bevel gears to cause such lubricant to be directed to and forced between the elements of the bearing 17 properly to lubricate them, and at the same time I have provided for a circulation of lubricant to and from the said bearing elements to insure the proper operation of all of the co-acting parts at all times. Furthermore my idea contemplates supplying lubrication in front of the rear bearing 18 for lubricating it from its front side, particularly where this bearing is of the taper roller type.

As teeth of a bevel pinion and driven bevel roll into engagement with each other, the pressure with which they contact and the shape of the teeth tends to force the lubricant from between them. I therefore form in the housing section 4 a lubricant duct 30 having an outlet port 32 in the space between the bearings 17 and 18 and an inlet port 31 closely adjacent to a point at which the gearing 19, 20 discharges or forces the lubricant outwardly or away from the meshing teeth, so that such lubricant will be forced under the pump or propelling action of such gearing through the port 31 into and through the duct 30 and port 32 into the chamber 4ᶜ in the section 4. I also form another duct 33 in the casing 4 which extends from a port 34 slightly in front of the bearing 17 to a port 35 in the chamber 4ᶜ, so that the lubricant forced into and forwardly out from the bearing 17 may find a return passageway by port 34, duct 33 and port 35 to the chamber 4ᶜ. The duct 33 may extend through the front end of the housing section 4 and normally be plugged by a plug 33′, to facilitate in construction, inspection of condition, and clearing, if necessary. The amount of lubricant which escapes through the bearing 18 may serve to preclude excess of pressure within the chamber 4ᶜ, but I prefer also to provide a return duct from the chamber 4ᶜ to the interior of the section 2. Such a duct is indicated by 36. It has an inlet port 37 in the chamber 4ᶜ and an outlet port 38 communicating with the interior of the casing section 2.

Each of the ducts 30, 33 and 36 may be formed, if desired, in the section 4 when it is cast.

Spirally cut bevel gears have been found to possess advantages in power transmitting mechanism of the class herein described, and have recently been somewhat extensively introduced commercially. Where the teeth of the bevel gears are spirally cut, as indicated in the drawings, in Fig. 1, their propelling action upon the lubricant may be even more effective than with straight cut teeth, since the ends of smaller diameter of the teeth of a co-acting pair of teeth first engage and then roll into engagement toward their ends of larger diameter, progressively, so to speak, tending in the actual construction illustrated to force or propel lubricant from between them and direct it into the inlet port 31.

With gears cut with teeth which are portions of right hand spirals, as shown in Fig. 1, the driving thrust for the pinion inwardly toward the axis of the driven gear is re-acted upon by a lesser thrust outwardly due to the normal tendency of the gears to force themselves apart along their respective axes, the resulting total thrust inwardly on the outside bearing 17, consequently being less than the total resulting thrust outwardly on the rearmost bearing 18 would be where left hand spirally cut bevel gears are used and both the driving thrust and the normal gear thrust is outwardly. However, where such right hand cut spiral bevels are employed and the driving thrust is taken on the front bearing 17, that bearing must be thoroughly lubricated in operation, and for this purpose I have found my invention to be particularly applicable.

It will be noted that with the construction embodying my invention the normal propelling action upon the lubricant of the bevel gears 19 and 20 is utilized to force lubricant through an adjacent port of a lubricant duct which will direct it to the bearing particularly desired to be lubricated, and that return passageways for this lubricant are provided so as to substantially keep up a circulation thereof.

To those skilled in the art of making mechanism of the class described, many alterations in construction and widely differing embodiments and applications of my invention will suggest themselves, without departing from the spirit and scope thereof. My disclosures and the description herein are purely illustrative, and are not intended to be in any sense limiting.

What I claim is:

1. In power transmission mechanism, in combination, a gear case comprising a pair of sections detachably connected together in a transverse vertical plane, each section having a frusto conical inward extension, sleeves each fitted into one of said extensions and having an inward projection, and a rotatable gear support mounted at either end on the inward projection of the adjacent one of said sleeves.

2. In power transmission mechanism, in combination, a gear case comprising a pair of sections detachably connected together in a transverse vertical plane, each section having a frusto conical inward extension, sleeves each having intermediate its ends a flange, each said sleeve being supported by one of said extensions with its flange abutting thereagainst, and a gear support at either end rotatably mounted on the adjacent end of one of said sleeves.

3. As a new article of manufacture, an axle housing comprising an enlarged gear receiving section and a pair of axle incasing tubes, each detachably connected at its inner end to the adjacent end of said enlarged section, either end of said enlarged section being the base of an inwardly tapering, integrally formed bearing support, and a gear support mounted at either end on the adjacent inner end of one of said tapering bearing supports.

4. As a new article of manufacture, an axle housing comprising an enlarged gear receiving section, having extending inwardly from either end thereof an inwardly tapering frusto conical bearing support, and a gear support mounted at either end on the adjacent inner end of one of said conical bearing supports.

5. As a new article of manufacture, an axle housing comprising an enlarged gear receiving section having extending inwardly from either end thereof an inwardly tapering frusto conical bearing support integrally connected at its base to the adjacent wall of said enlarged section, and a gear support mounted at either end on the adjacent inner end of one of said conical bearing supports.

6. As a new article of manufacture, in combination, an axle housing comprising an enlarged gear receiving section having extending inwardly from one end thereof an inwardly tapering frusto conical bearing support and outwardly from either end thereof an axle incasing tube, a differential housing rotatably mounted at one end on said frusto conical bearing support and at its other end rotatably supported from the adjacent end of said gear receiving section, a propeller shaft mounted in said axle housing, a bevel pinion carried by said propeller shaft within said enlarged gear receiving section, and a bevel ring gear carried by said differential housing, meshing with said bevel pinion and disposed adjacent said frusto conical bearing support to direct the thrust of said bevel gears in operation toward said conical bearing support.

7. In combination, an axle housing, a propeller shaft mounted therein upon a plurality of bearings, a bevel driving gear at the end of said propeller shaft within the housing, a driven gear suitably supported within said housing and meshing with said driving gear, and a lubricant duct, having an inlet port disposed in the path of propulsion of lubricant from said bevel gears and a discharge port between said bearings along the propeller shaft.

8. In combination, an axle housing, a driving shaft mounted in bearings therein, there being a lubricant chamber between said bearings, a bevel driving gear at the end of said propeller shaft within said housing, a driven gear suitably supported within said housing and meshing with said driving gear, and a lubricant duct having an inlet port arranged in the line of lubricant propulsion from said bevel gears and an outlet port in said lubricant chamber between said bearings.

9. In combination, an axle housing having a driving shaft mounted in bearings therein, there being a lubricant chamber between said bearings, a driving bevel gear secured to the end of said driving shaft within said housing, a driven gear suitably supported within said housing and meshing with said driving gear, a lubricant supply duct having an inlet port arranged in the path of lubricant propulsion from said bevel gears, and an outlet port in said lubricant chamber between said bearings, and a lubricant circulation duct having a port in said housing extending in front of the frontmost bearing for said driving shaft and a port in said lubricant chamber in the rear of said frontmost bearing.

10. In combination, an axle housing having a driving shaft mounted in bearings therein, there being a lubricant chamber between said bearings, a driving bevel gear secured to the end of said driving shaft within said housing, a driven gear suitably supported within said housing and meshing with said driving gear, a lubricant supply duct having an inlet port arranged in the path of lubricant propulsion from said bevel gears, and an outlet port in said lubricant chamber between said bearings, a lubricant circulation duct having a port in said housing extending in front of the frontmost bearing for said driving shaft and a port in said lubricant chamber in the rear of said frontmost bearing, and a lubricant duct having an inlet port in said lubricant chamber and an outlet port in said housing outside the path of propulsion of lubricant from said bevel gears.

11. In combination, an axle housing having an enlarged gear receiving and lubricant holding section, a propeller shaft, a plurality of anti-friction bearings positioned in said housing and in which said propeller shaft is rotatably mounted, a spirally cut bevel driving gear at the inner end of said propeller shaft within the housing, a driven gear suitably supported within the housing and meshing with said driving gear, and a lubricant duct having an inlet port disposed in the path of propulsion of lubricant from said gears and a discharge port between said bearings along the propeller shaft.

12. In combination, an axle housing having an enlarged gear receiving and lubricant holding section, a propeller shaft, a plurality of anti-friction bearings positioned in said housing and in which said propeller shaft is rotatably mounted, a right hand spirally cut bevel driving gear at the inner end of said propeller shaft within the housing, a right hand spirally cut bevel driven gear suitably supported within the housing and meshing with said driving gear, and a lubricant duct having an inlet port disposed in the path of propulsion of lubricant from said gears and a discharge port between said bearings along the propeller shaft.

13. In combination, an axle housing having an enlarged gear receiving and lubricant holding section and a forwardly extending tubular section provided with anti-friction bearing supports having a lubricant chamber between them, taper roller bearings arranged in said bearing supports, a propeller shaft mounted in said bearings, a right hand cut spiral bevel driving pinion at the end of said propeller shaft within said enlarged section of said housing, a right hand spirally cut bevel driven gear suitably supported within said enlarged section of said housing and meshing with said driving gear, and a lubricant duct having an inlet port disposed in the path of propulsion of lubricant from said bevel gears and a discharge port in said lubricant chamber between said bearings along the propeller shaft.

14. In combination, an axle housing having an enlarged gear receiving and lubricant holding section, a propeller shaft, a plurality of anti-friction bearings arranged within said housing and in which said propeller shaft is rotatably mounted, a bevel driving gear at the inner end of said propeller shaft within said enlarged portion of said housing, a driven gear suitably supported within said housing and meshing with said driving gear, and means for directing lubricant from within said enlarged section of said housing under the propelling action of said bevel gears in operation to the frontmost of said anti-friction bearings for said propeller shaft.

15. As a new article of manufacture, a housing for a bevel gear drive axle, having an enlarged gear receiving and lubricant holding section and a forwardly extending, tubular, propeller shaft supporting section having a lubricant chamber, and a lubricant duct having an inlet port disposed within said enlarged section adjacent the point at which the teeth of the set of driving bevel gears mesh, and an outlet port in said lubricant chamber in said forwardly extending section.

16. In combination, an axle housing having an enlarged gear receiving and lubricant holding section, a propeller shaft, a plurality of anti-friction bearings arranged within said housing and in which said propeller shaft is rotatably mounted, a bevel driving gear carried by said propeller shaft within said enlarged portion of said housing, a bevel driven gear rotatably mounted within said housing and meshing with said driving gear, and means for directing lubricant from within said enlarged section of said housing under the propelling action of said bevel gears and circulating it to lubricate said anti-friction bearings.

17. In combination, an axle housing having an enlarged gear receiving and lubricant holding section, a propeller shaft, a plurality of anti-friction bearings positioned in said housing and in which said propeller shaft is rotatably mounted, a spirally cut bevel driving gear carried by said propeller shaft and disposed within said housing, a spirally cut bevel driven gear rotatably mounted within the housing and meshing with said driving gear, and a lubricant duct having an inlet port disposed in the path of propulsion of lubricant from said gears, and a discharge port disposed to direct the lubricant so that it will lubricate said anti-friction bearings.

18. In combination, an axle housing having an enlarged gear receiving and lubricant holding section, a propeller shaft, a plurality of anti-friction bearings positioned in said housing and in which said propeller shaft is rotatably mounted, a right hand spirally cut bevel driving gear carried by said propeller shaft and disposed within said housing, a right hand spirally cut bevel driven gear rotatably mounted within the housing and meshing with said driving gear, and a lubricant duct having an inlet port disposed in the path of propulsion of lubricant from said gears, and a discharge port disposed to direct the lubricant so that it will lubricate said anti-friction bearings.

19. In combination, an axle housing having an enlarged gear receiving and lubricant holding section and a forwardly extending tubular section, a pair of anti-friction bearings spaced apart and carried by said tubular section, and each having taper rollers, a propeller shaft mounted in said bearings, means for directing lubricant from said enlarged section to said anti-friction bearings for lubricating them, said means having an inlet port disposed within said enlarged section, and means in said enlarged section for forcing lubricant therefrom through said inlet port.

In testimony whereof I affix my signature in the presence of one witness.

WALTER C. BAKER.

Witness:
GEO. B. PITTS.